US012627037B2

(12) United States Patent
Li et al.

(10) Patent No.: US 12,627,037 B2
(45) Date of Patent: May 12, 2026

(54) IN-PANEL ANTENNA ISOLATION FOR A DUAL-POLARIZED MASSIVE MULTIPLE INPUT MULTIPLE OUTPUT (MIMO) ANTENNA ARRAY

(71) Applicant: Samsung Electronics Co., Ltd., Suwon-si (KR)

(72) Inventors: Jiantong Li, McKinney, TX (US); Khurram Muhammad, Southlake, TX (US)

(73) Assignee: Electronics Co., Ltd., Suwon-si (KR)

( * ) Notice: Subject to any disclaimer, the term of this patent is extended or adjusted under 35 U.S.C. 154(b) by 310 days.

(21) Appl. No.: 18/296,318

(22) Filed: Apr. 5, 2023

(65) Prior Publication Data

US 2023/0369752 A1     Nov. 16, 2023

Related U.S. Application Data

(60) Provisional application No. 63/341,496, filed on May 13, 2022.

(51) Int. Cl.
*H01Q 1/38*         (2006.01)
*H01Q 21/28*        (2006.01)
*H04B 7/0413*       (2017.01)

(52) U.S. Cl.
CPC .............. *H01Q 1/38* (2013.01); *H01Q 21/28* (2013.01); *H04B 7/0413* (2013.01)

(58) Field of Classification Search
CPC .......... H01Q 1/38; H01Q 21/28; H01Q 1/521; H01Q 1/523; H04B 7/0413
See application file for complete search history.

(56) References Cited

U.S. PATENT DOCUMENTS

| | | | | |
|---|---|---|---|---|
| 5,952,983 | A | * | 9/1999 | Dearnley ............... H01Q 1/523 |
| | | | | 343/810 |
| 9,799,953 | B2 | | 10/2017 | Apaydin et al. |
| 10,003,127 | B2 | | 6/2018 | Liu et al. |
| 11,205,847 | B2 | | 12/2021 | Sherlock |
| 11,283,191 | B2 | | 3/2022 | Onaka et al. |
| 11,336,006 | B2 | | 5/2022 | Niakan et al. |
| 11,387,568 | B2 | | 7/2022 | Stanley et al. |

(Continued)

FOREIGN PATENT DOCUMENTS

CN        106953173 A        7/2017

OTHER PUBLICATIONS

Ji et al., "Extending 5G Tdd Coverage With XDD: Cross Division Duplex," IEEE Access, vol. 9, pp. 51380-51392, Apr. 2021, 13 pages.

(Continued)

*Primary Examiner* — David E Lotter

(57)        ABSTRACT

An apparatus includes a substrate and first and second antenna panels on the substrate. The first antenna panel includes an array of first antenna elements. The second antenna panel includes an array of second antenna elements and a first wall isolator. The first wall isolator protrudes from the second antenna panel. The first wall isolator forms a border to surround at least one of the second antenna elements on the second antenna panel. The first wall isolator is configured to electromagnetically isolate the at least one second antenna element from the first antenna elements to produce N-to-N antenna isolation.

20 Claims, 14 Drawing Sheets

(56)     References Cited

U.S. PATENT DOCUMENTS

2017/0264012 A1 *   9/2017   Clark ..................... H01Q 1/523

OTHER PUBLICATIONS

Agarwal et al., "Isolation improvement of 5 GHz WLAN antenna array using metamaterial absorber," 2016 URSI Asia-Pacific Radio Science Conference (URSI AP-RASC), Aug. 2016, pp. 1050-1053, 4 pages.
Hwangbo et al., "Mutual coupling reduction using micromachined complementary meander-line slots for a patch array antenna," IEEE Antennas and Wireless Propagation Letters, vol. 16, Feb. 2017, pp. 1667-1670, 4 pages.

* cited by examiner

700

702

400

1100

1000

1200

START

PROVIDE SIGNALS TO AN ARRAY OF FIRST
ANTENNA ELEMENTS     1202

RECEIVE SIGNALS FROM AN ARRAY OF SECOND
ANTENNA ELEMENTS     1204

REDUCE WAVE PROPAGATION USING A FIRST
WALL ISOLATOR     1206

REDUCE WAVE PROPAGATION USING A SECOND
WALL ISOLATOR     1208

END

IN-PANEL ANTENNA ISOLATION FOR A DUAL-POLARIZED MASSIVE MULTIPLE INPUT MULTIPLE OUTPUT (MIMO) ANTENNA ARRAY

CROSS-REFERENCE TO RELATED APPLICATION AND PRIORITY CLAIM

This application claims priority under 35 U.S.C. § 119(e) to U.S. Provisional Patent Application No. 63/341,496 filed on May 13, 2022, which is hereby incorporated by reference in its entirety.

TECHNICAL FIELD

This disclosure relates generally to multiple-input multiple-output (MIMO) antenna array devices and processes. More specifically, this disclosure relates to an in-panel antenna isolation enhancement component for a dual-polarized MIMO antenna array.

BACKGROUND

As the two main operation modes of cellular communication systems, frequency division duplexing (FDD) and time division duplexing (TDD) each have unique advantages. To maintain the uplink (UL) and downlink (DL) communication, FDD works with different frequency bands, while TDD operates within several distinct time periods. One advantage of FDD is that coverage as FDD can access all time resources, while TDD assigns a small portion of time resources to UL, thus reducing the overall coverage. FDD performs with better latency because TDD requires gap timing periods, longer than FDD. Compared with FDD, TDD is capable of allocating time resources to UL and DL based on the specific data traffic of both directions. Typically, the majority of time resources are used by the DL due to its heavy data traffic. Moreover, it is not required to consume large gap bands between UL and DL channels for TDD systems.

SUMMARY

This disclosure provides an in-panel antenna isolation enhancement component for a dual-polarized massive MIMO antenna array.

In a first embodiment, apparatus includes a substrate and first and second antenna panels on the substrate. The first antenna panel includes an array of first antenna elements. The second antenna panel includes an array of second antenna elements and a first wall isolator. The first wall isolator protrudes from the second antenna panel. The first wall isolator forms a border to surround at least one of the second antenna elements on the second antenna panel. The first wall isolator is configured to electromagnetically isolate the at least one second antenna element from the first antenna elements to produce N-to-N antenna isolation.

In a second embodiment, an electronic device includes a MIMO antenna, transmit (TX) processing circuitry, and receive (RX) processing circuitry. The MIMO antenna includes a substrate and first and second antenna panels on the substrate. The first antenna panel includes an array of first antenna elements. The second antenna panel includes an array of second antenna elements and a first wall isolator. The first wall isolator protrudes from the second antenna panel. The first wall isolator forms a border to surround at least one of the second antenna elements on the second antenna panel. The first wall isolator is configured to electromagnetically isolate the at least one second antenna element from the first antenna elements to produce N-to-N antenna isolation. The TX processing circuitry is coupled to the first antenna panel and configured to provide signals to the array of first antenna elements. The RX processing circuitry is coupled to the second antenna panel and configured to receive signals from the array of second antenna elements.

In a third embodiment, a method includes providing signals to a first antenna panel including an array of first antenna elements on a substrate. The method also includes receiving signals from a second antenna panel including an array of second antenna elements on the substrate. The method further includes reducing wave propagation between the array of first antenna elements and the array of second antenna elements using a first wall isolator (i) protruding from the second antenna panel, (ii) forming a border to surround at least one of the second antenna elements on the second antenna panel, and (iii) isolating the at least one second antenna element from the first antenna elements to produce N-to-N antenna isolation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
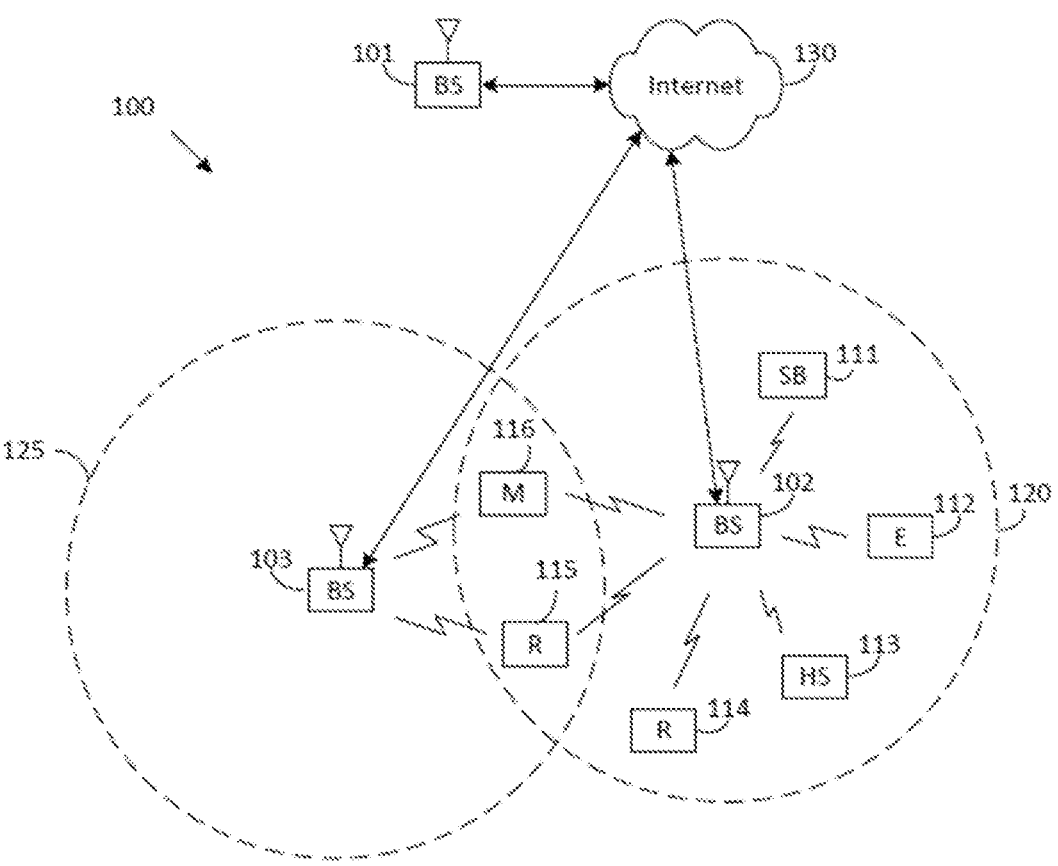
FIG. 1 illustrates an example communication system in accordance with an embodiment of this disclosure.

FIGS. 1 through 12, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz).

The advantages of both FDD and TDD are also realized in cross-division duplex (XDD), which simultaneously handles UL and DL in a same contiguous band, i.e., XDD maintains FDD features in an unpaired TDD band. Consequently, XDD is capable of longer propagation distance and better coverage, resulting in full duplex communication. However, this full duplex operation requires significant antenna isolation between transmitter antenna panel and receiver antenna panel because a portion of DL is assigned to UL whereas the DL is transmitting adjacent channel power (ACP) in the UL band. With a minimal guard band between UL and DL, adjacent channel leakage is difficult to block from the DL to interfere with the intended received signal, resulting in self-interference (SI). Specifically, significant interference from adjacent channel leakage is from power amplifiers (PAs) in nearby high-power base stations operating in adjacent channels.

Antenna isolation, measured via port-to-port coupling, is a critical specification of base station antenna systems to prevent undesired signal. For an XDD system, the low isolation means more antenna coupling, which results in 1) overflow or TX ACP in RX ULD band; 2) distortion of signal in RX band due to nonlinearity of LNAs; and 3) signal-to-noise ratio (SNR) degradation, hence the isolation enhancement techniques are required to reduce the interference. For a small antenna array, increasing a distance separating TX and RX antenna panels can provide sufficient isolation between them. However, it is quite challenging to accurately employ interference cancellation in multiple-input multiple-output (MIMO) systems due to many transmitters and receivers operating at the base station. The MIMO technology is one option to increase channel efficiency within a same spectrum. Moreover, a massive MIMO configuration is utilized for 5G/6G base stations to further improve a channel capacity by using a large number of antennas. With a massive MIMO antenna array configuration, a narrower beam is created, thus the power can be spatial focused. Further, beamforming techniques are adopted providing an interference-free and high-capacity link to each user, thus increasing the spatial resolution without increasing inter-cell complexity. For a 5G massive MIMO based base station with full duplex operation, it poses several challenges to maintain high antenna isolation with respect to the close proximity of a large number of antennas. Therefore, there is a necessity for a low-complexity solution that simultaneously achieve high antenna isolation to address self-interference of XDD massive MIMO system.

For an XDD (or full duplex) massive MIMO system, the transmitted propagation of each transmit (TX) antenna may interfere with each received signal at each received (RX) antenna. A commonly-used self-interference cancellation solutions of single-input single-output (SISO) systems are not applicable due to following reasons. A first reason is that one coupling between a TX antenna and an RX antenna has a unique frequency response, dependent on the location of the two antennas with respect to each other as well as within the antenna panel. A second reason is that multiple transmitted signals interfere with the RX antennas with arbitrary time or phase variations. A third reason is that mutual coupling occurs between the DL signal on a transmit antenna to all receive antennas receiving UL, thus all port-to-port isolation of an N-to-N system is supposed to improve simultaneously. A fourth reason is that one coupling between a TX antenna and an RX antenna has a unique frequency response, dependent on the location of the two antennas with respect to each other as well as within the antenna panel. A fifth reason is that dual-polarized antenna design is required, which means all 2N-to-2N coupling satisfy the isolation requirements. A sixth reason is that other sources also degrade isolation performance such as complicated feeding network, radiation distortions of edge/feeding vias, and environment.

This disclosure targets an antenna isolation improvement within an antenna panel by reducing radiated direct-path and diffracted propagation, resulting in cancellation of channel-interference in massive MIMO systems. For a 5G/6G massive MIMO based base station, maintaining high antenna isolation is a challenge given the close proximity of a large number of antennas. Therefore, a design of an antenna isolator to simultaneously achieve high isolation for all antenna ports is required to improve the system performance of a base station antenna system.

Figure 2:
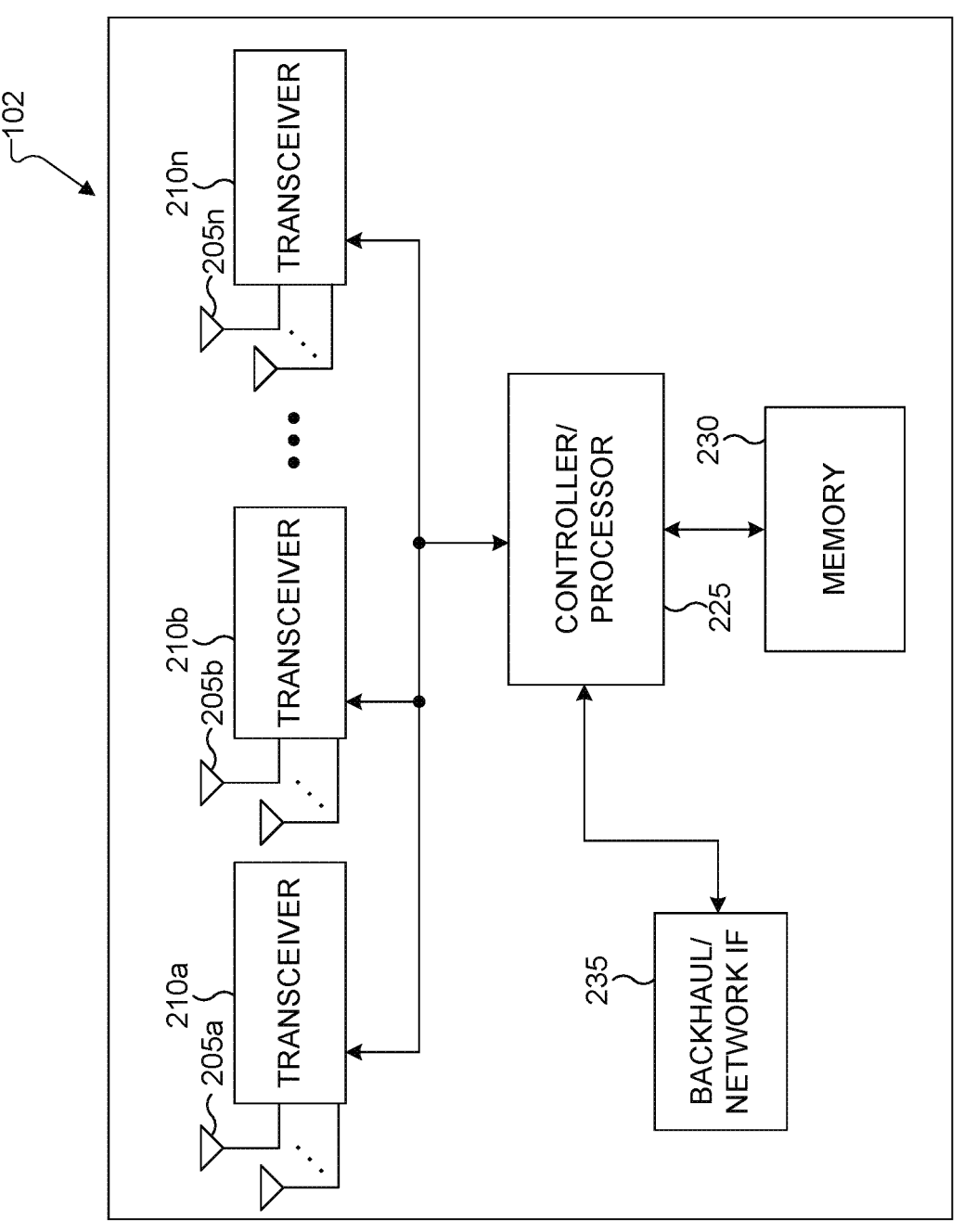
FIGS. 2 and 3 illustrate example electronic devices in accordance with an embodiment of this disclosure.
Figure 3:
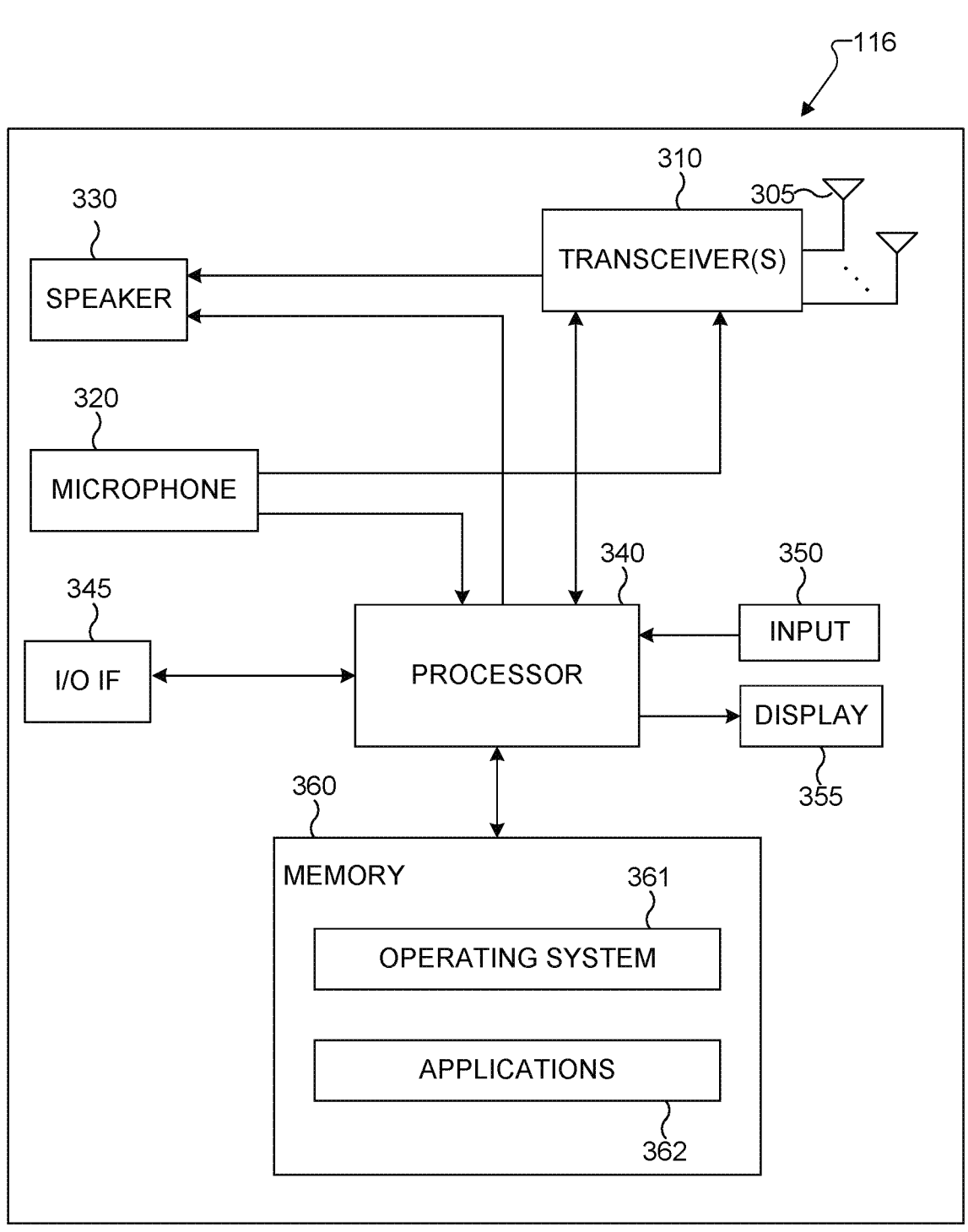

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
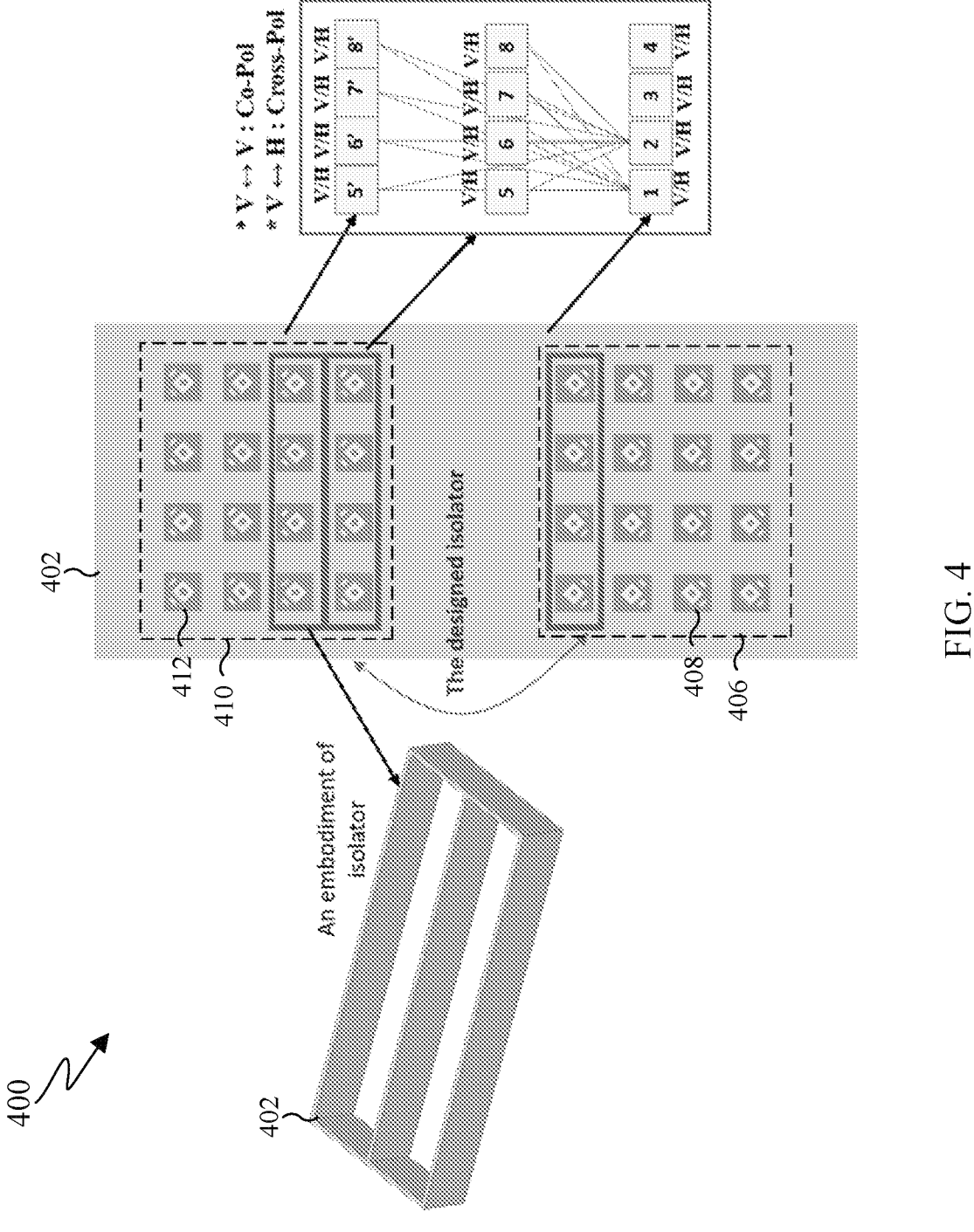
FIG. 4 illustrates an example in-panel antenna isolation enhancement for a dual-polarized MIMO system in accordance with this disclosure.

FIG. 4 illustrates an example in-panel antenna isolation enhancement for a dual-polarized MIMO system 400 in accordance with this disclosure. The embodiment of the example dual-polarized MIMO system 400 illustrated in FIG. 4 is for illustration only. FIG. 4 does not limit the scope of this disclosure to any particular implementation of an electronic device.

As shown in FIG. 4, to address the aforementioned challenges, an in-panel isolator 402 is designed to reduced directed and diffracted wave propagations within an antenna panel 404. The illustrated dual-polarized MIMO system 400 also includes an array 406 of sixteen transmitter antennas 408 and an array 410 of sixteen receiver antennas 412 on the antenna panel. The direct and diffracted wave propagations can be suppressed by optimizing parameters of the in-panel isolator 402, while not influencing a radiation performance of the arrays 406 and 410.

Although FIG. 4 illustrates an example dual-polarized MIMO system 400, various changes may be made to FIG. 4. For example, the sizes, shapes, and dimensions of the dual-polarized MIMO system 400 and its individual components can vary as needed or desired. Also, the number and placement of various components of the dual-polarized MIMO system 400 can vary as needed or desired. In addition, the dual-polarized MIMO system 400 may be used in any other suitable wireless communication process and is not limited to the specific processes described above.

Figure 5:
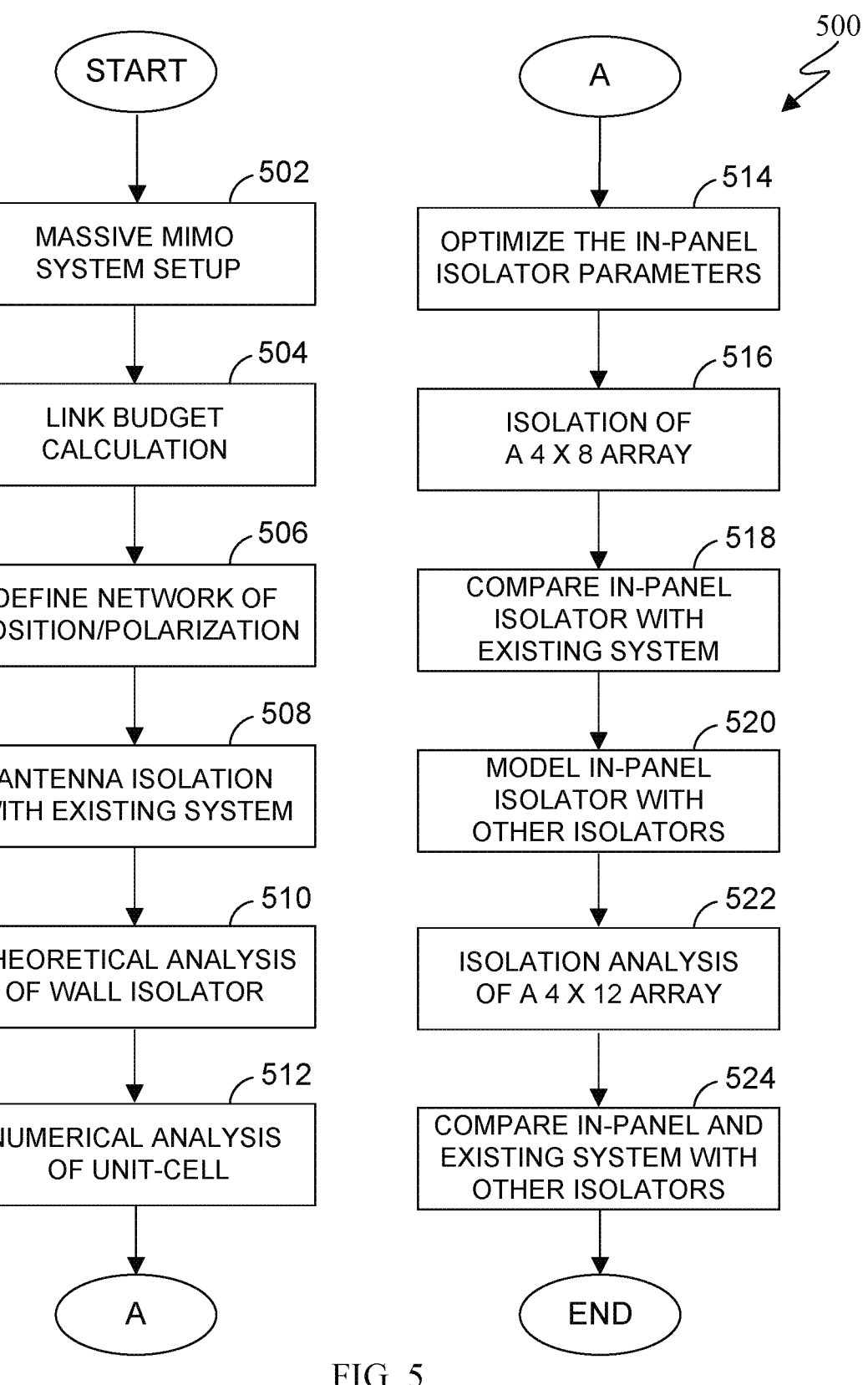
FIG. 5 illustrates an example method for design of a dual-polarized MIMO antenna array with in-panel antenna isolation enhancement in accordance with this disclosure.

FIG. 5 illustrates an example method for design of a dual-polarized MIMO antenna array with in-panel antenna isolation enhancement in accordance with this disclosure.

As shown in FIG. 5, a massive MIMO system 400 can be designed in step 502. The massive MIMO system 400 can include a first array 406 of transmitter antennas 408, such as sixteen transmitter antennas 408, and a second array 410 of receiver antennas 412, such as sixteen receiver antennas 412.

A link budget calculation is performed for the antenna panel at step 504. The link budget is dependent on a distance to target and frequencies and gains of the antennas. The link budget accounts for all of the gains and losses from the transmitter at BS 102 through a transmission medium to the target receiver or UE 104 and 111-116.

An isolation network is defined to analyze the port-to-port coupling with respect to element position at step 506. As this is dual-polarized configuration, two polarized waves are noted as V and H polarizations. Elements 1 and 2 are defined as observation ports, while elements 5-8 and 5'-8' are switched to keep track of each port-to-port coupling.

Direct and diffracted wave propagation can be determined for existing systems of antenna isolation at step 508. Existing systems refer to a massive MIMO system with the same setup and parameters as the massive MIMO system 400 without the in-panel isolator 402. The wave propagation can be calculated using theoretical analysis or measured results of the existing systems.

A theoretical analysis of the MIMO system 400 with the in-panel isolator 402 can be performed at step 510. The theoretical analysis of MIMO system 400 with the in-panel isolator 402 can be performed to determine different measurements of the in-panel isolator 402 to perform communication in a MIMO system 400. Different measurements can be analyzed for determining optimal dimensions.

A numerical analysis of a unit-cell of the MIMO system 400 with the in-panel isolator 402 can be performed at step 512. Based on assumptions of ideal environment without considerations of specific array configurations, numerical methods can be used to analyze electromagnetic fields of each port-to-port coupling.

Parameters of the in-panel isolator 402 can be optimized at step 514. Using the theoretical values as starting point, numerical methods can be used to optimize the parameters. Programs, such as Ansys HFSS simulator, can be used to optimize the parameters of the in-panel isolator 402.

An analysis of the in-panel isolator 402 in a 4×8 array can be performed in step 516. The analysis can include a port-to-port coupling analysis using the in-panel isolator 402. The analysis can also include a port-to-port coupling analysis of existing systems.

The results of the analysis for the MIMO system 400 with in-panel isolator 402 can be compared to existing systems at step 518. The MIMO system 400 with the in-panel isolator 402 can be compared to the existing systems at different polarization levels.

Additional models of MIMO systems with an in-panel isolator 402 and existing systems can be modeled at step 520. For example, an additional isolator can be positioned between the first array 406 and the second array 410 for both the MIMO system and the existing systems.

An analysis of the in-panel isolator 402 with the additional isolator in a 4×12 array can be performed in step 522. The analysis can include a port-to-port coupling analysis using the in-panel isolator 402 and the additional isolator. The analysis can also include a port-to-port coupling analysis of existing systems with the additional isolator.

The results of the analysis for the MIMO system 400 with in-panel isolator 402 and additional isolator can be compared to existing systems with the additional isolator at step 524. The MIMO system 400 with the in-panel isolator 402 can be compared to the existing systems at different polarization levels.

The designed MIMO system 400 with in-panel isolator 402 can work at sub-6 GHz (3.4 GHz to 3.6 GHz) operation. As dimensions of the in-panel isolator 402 can be determined by a wavelength at a given frequency, the method 500 can also be applied to higher frequencies such as mmWave by changing the parameters of the in-panel isolator 402, such as wall length, wall width, and wall height. Therefore, in-panel isolator 402 can be a candidate of 5G or 6G base station antenna isolators. Although a unit-cell include four antenna elements is considered in this disclosure, the unit-cell could be modified, such as a fence-wall of 1, 2, 4, or more elements. Examples of other configurations for in-panel isolators 600-602 are shown in FIGS. 6A-6C.

Although FIG. 5 illustrates one example of a method 500 for design of a dual-polarized MIMO antenna array with in-panel antenna isolation enhancement, various changes may be made to FIG. 5. For example, while shown as a series of steps, various steps in FIG. 5 may overlap, occur in parallel, or occur any number of times.

Figure 6C:
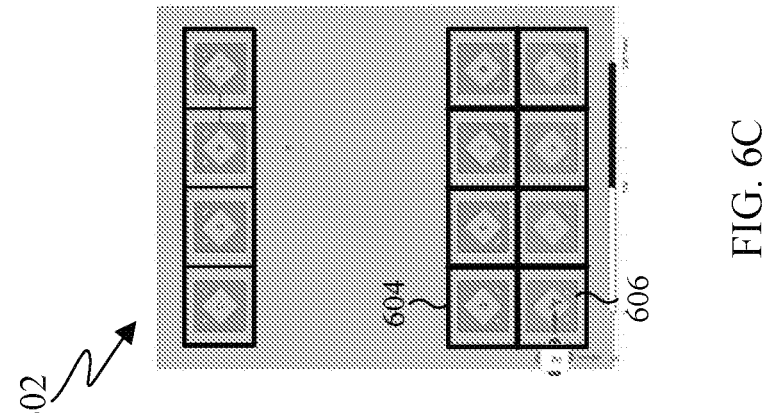
FIGS. 6A through 6C illustrate example in-panel antenna isolation enhancements for a dual-polarized MIMO antenna array in accordance with this disclosure.
Figure 6B:
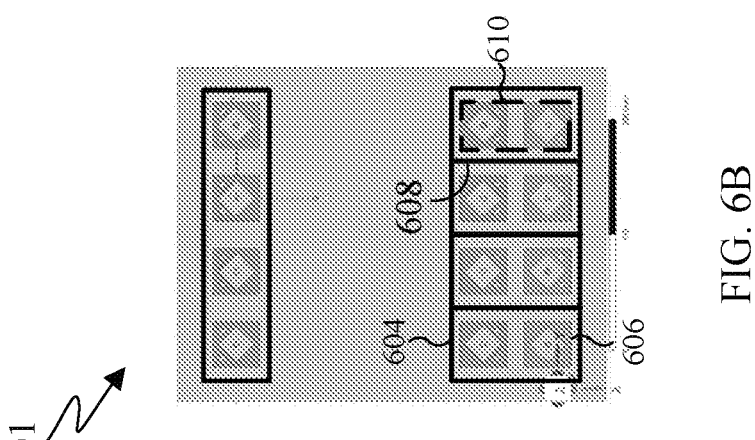
Figure 6A:
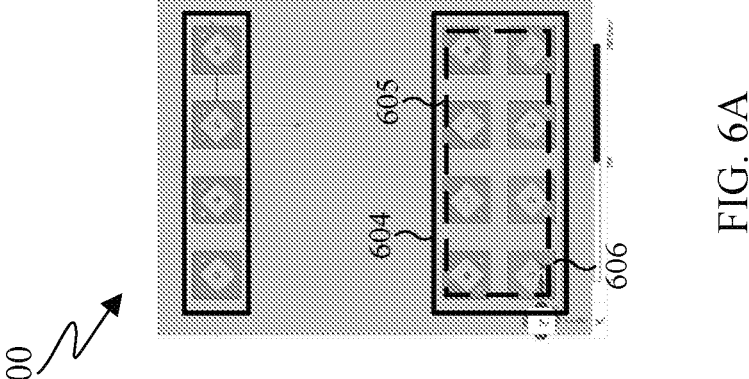

FIGS. 6A through 6C illustrate example arrangements of in-panel isolators 600-602 for a dual-polarized MIMO antenna array in accordance with this disclosure. The embodiments of the in-panel isolators 600-602 illustrated in FIGS. 6A through 6C are for illustration only. FIGS. 6A through 6C do not limit the scope of this disclosure to any particular implementation of a MIMO system.

As shown in FIG. 6A, in-panel isolator 600 can have a single outer wall 604 around a group 605 of antenna elements 606. For example, the outer wall 604 completely surrounds eight antenna elements 606 on a surface of the antenna panel. The single outer wall 604 can be used to surround any number of antenna elements 606 on an antenna panel.

As shown in FIG. 6B, in-panel isolator 601 can have one or more interior walls 608, in addition to an outer wall 604, around a subgroup 610 of antenna elements 606. The interior walls 608 can evenly or unevenly divide subgroups 610 of antenna elements. For example, the interior wall 608 can divide subgroups 610 of two antenna elements within the group 605 of antenna elements 606.

As shown in FIG. 6C, in-panel isolator 602 can have one or more interior walls 608, in addition to the outer wall 604, to isolate each antenna element 606 from other antenna elements 606 in group 605 of antenna elements 606. For FIGS. 6A through 6C, the one or more interior walls 608 can be similarly or differently dimensioned from others of the one or more interior walls 608 or the outer wall 604.

Although FIGS. 6A through 6C illustrate example arrangements of in-panel isolators 600-602 for a dual-polarized MIMO antenna array, various changes may be made to FIGS. 6A through 6C. For example, the sizes, shapes, and dimensions of the in-panel isolators 600-602 and their individual components can vary as needed or desired.

Figure 7A:
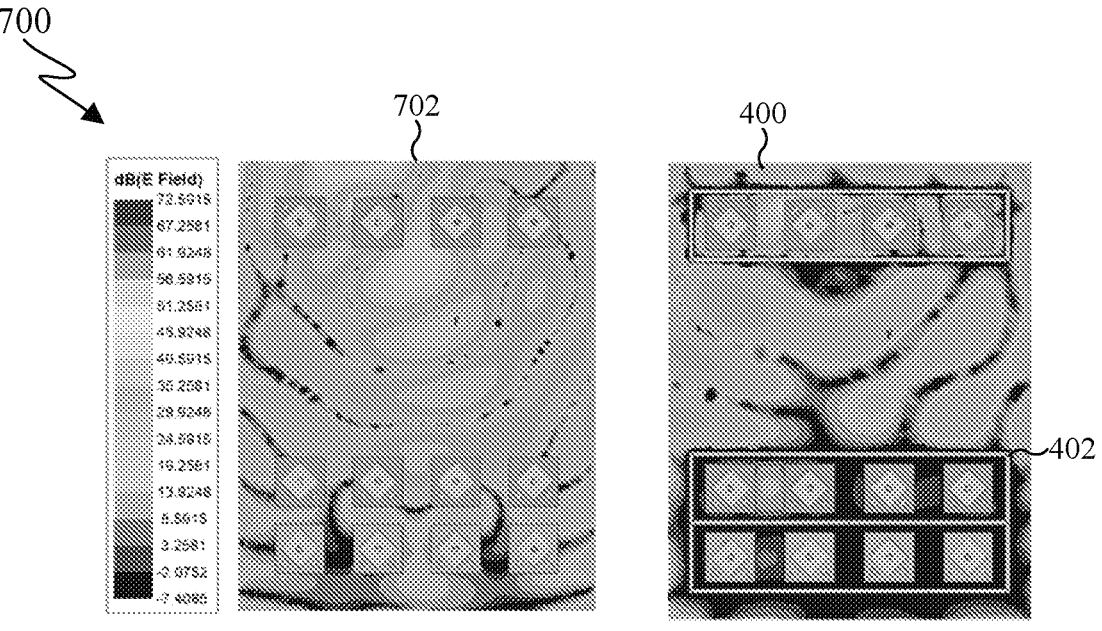
FIGS. 7A through 7C illustrate an example propagation and parameter analysis for the in-panel antenna isolation enhancement in accordance with this disclosure.
Figure 7B:
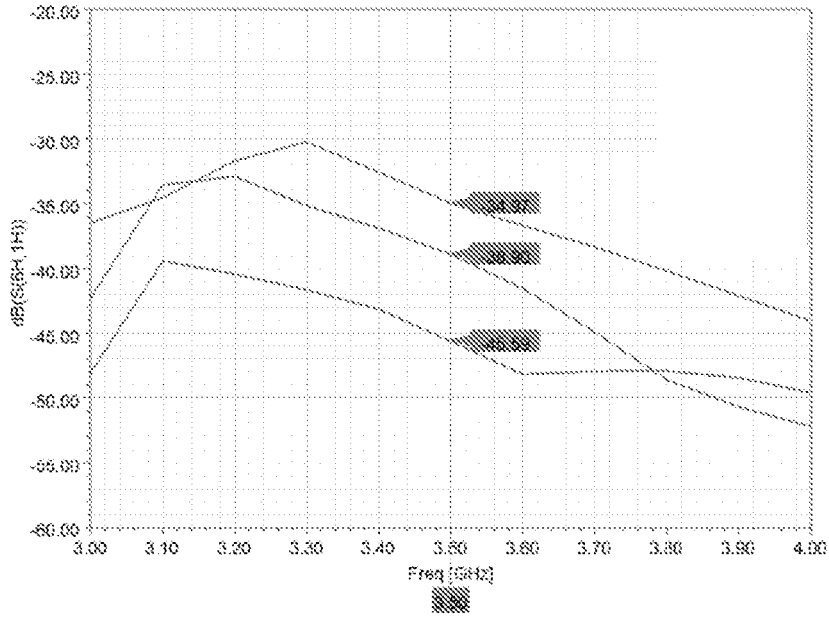
Figure 7C:
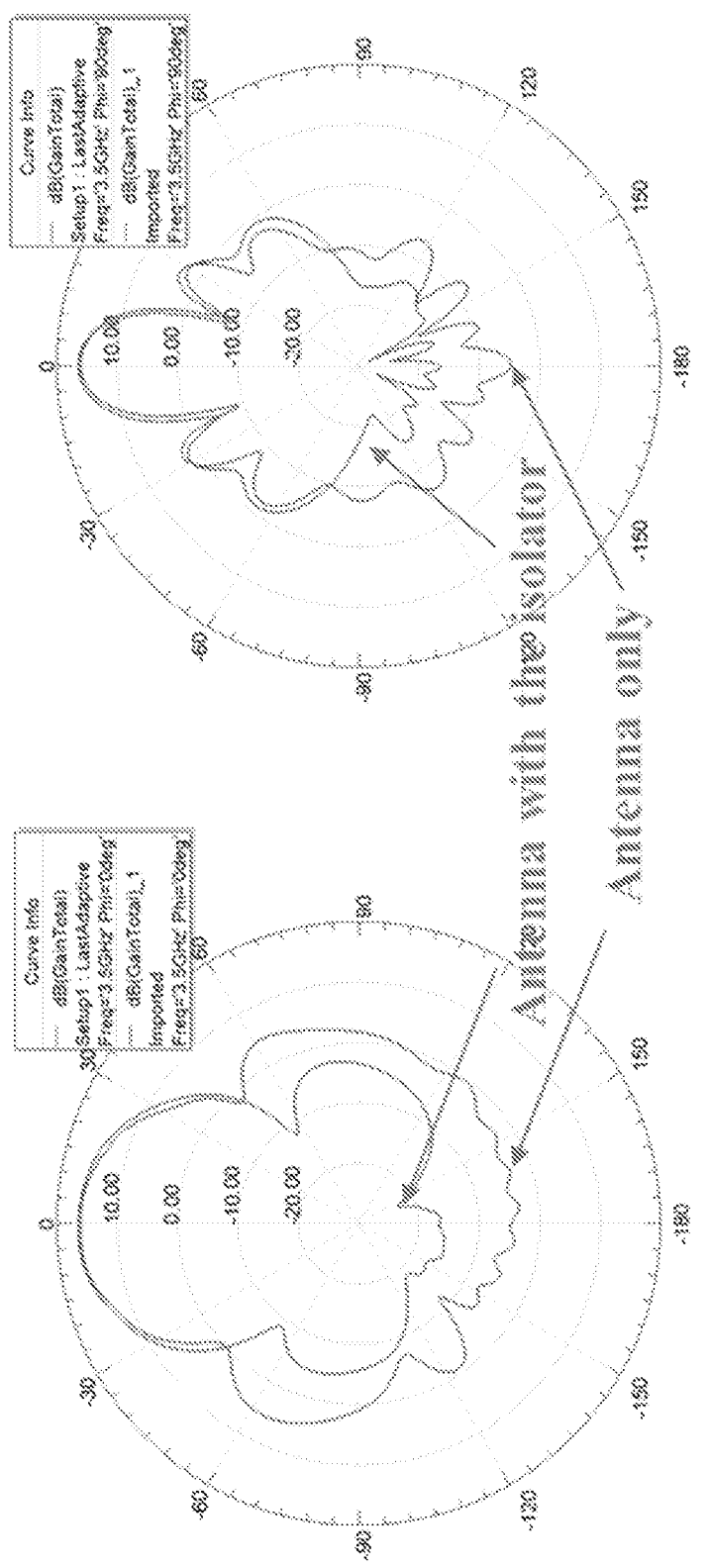

FIGS. 7A through 7C illustrate an example propagation and parameter analysis for the in-panel antenna isolation enhancement in accordance with this disclosure. The embodiments of the propagation and parameter analysis illustrated in FIGS. 7A through 7C is for illustration only. FIGS. 7A through 7C do not limit the scope of this disclosure to any particular implementation of a MIMO system. The propagation and parameter analysis of FIG. 7A-7C is an example of the As shown in FIG. 7A, an in-panel isolator 402 can reduce direct propagation modes based on wave propagation analysis 700 of MIMO system 400 and existing array 702. Compared with existing technique, the port-to-port coupling is reduced with the designed isolator. As the length and width follows the element spacing of antenna elements, the height of isolator is optimized for isolation enhancement. As shown in FIG. 7B, a height of 0.375% for the in-panel isolator 402 provides optimal performance. FIG. 7C shows that antenna gain is improved with better side-lobe control due to the in-panel isolator 402.

Although FIGS. 7A through 7C illustrate an example propagation and parameter analysis for the in-panel antenna isolation enhancement, various changes may be made to FIGS. 7A through 7C. For example, the sizes, shapes, and dimensions of the in-panel isolator 402 and its individual components can vary as needed or desired.

Figure 8A:
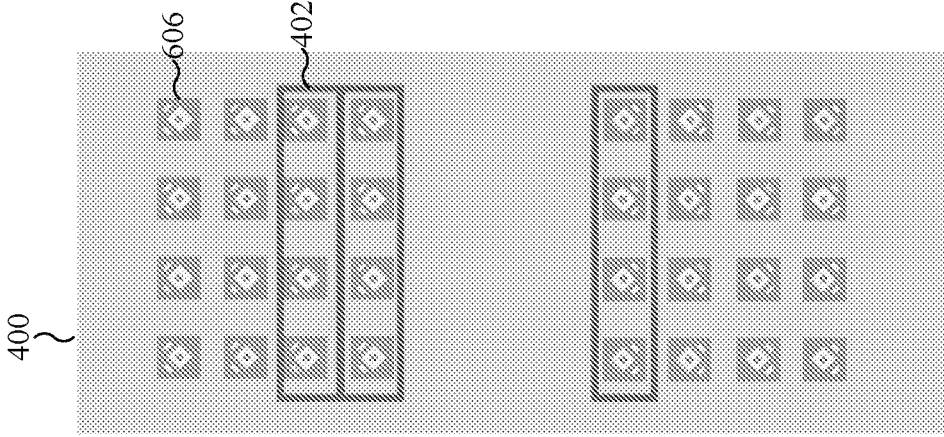
FIGS. 8A through 8C illustrate an example enhancement verification between an antenna array without the in-panel antenna isolation enhancement and an antenna array with the in-panel antenna isolation enhancement in accordance with this disclosure.
Figure 8A:
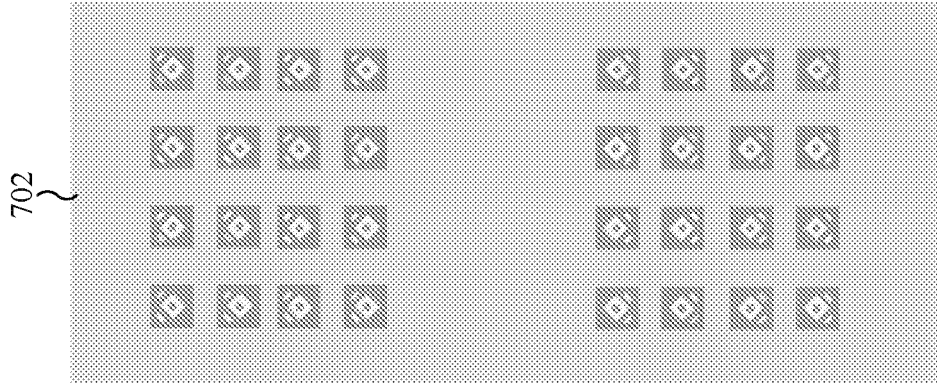
Figure 8A:
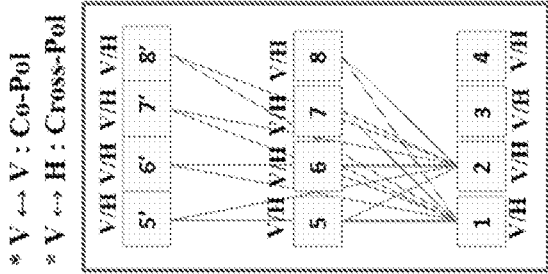
Figure 8B:
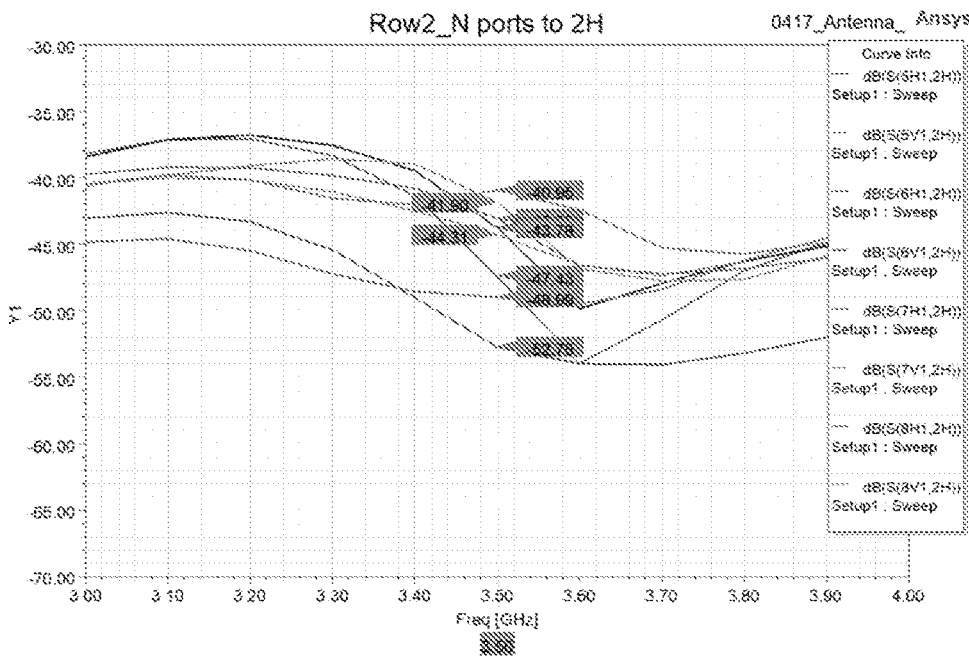
Figure 8C:
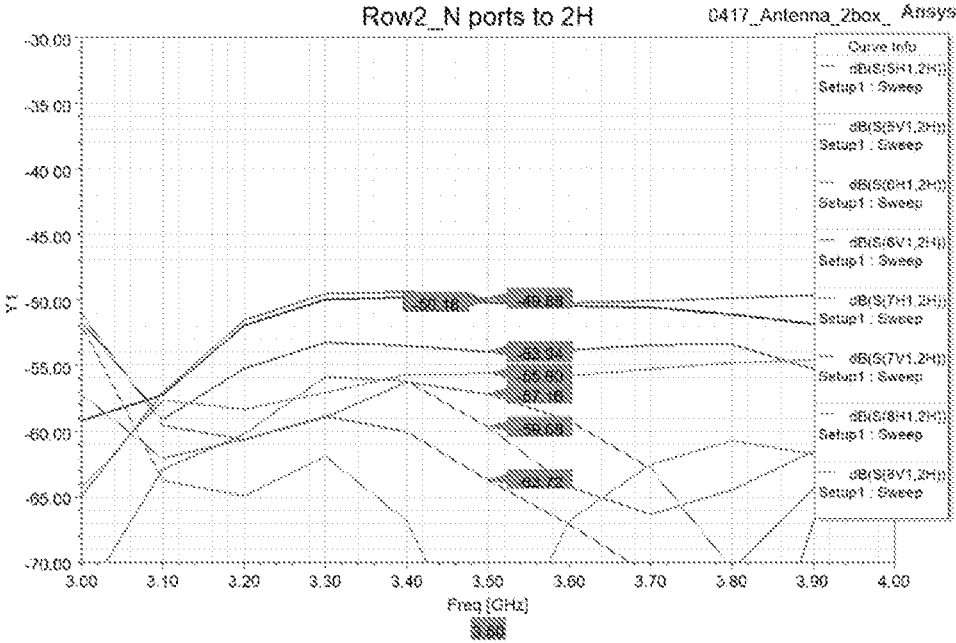

FIGS. 8A through 8C illustrate an example enhancement verification between an antenna array 702 without the in-panel antenna isolator 402 and an antenna array with the in-panel antenna isolator 402 in accordance with this disclosure. The embodiments of the example enhancement verification illustrated in FIGS. 8A through 8C is for illustration only. FIGS. 8A through 8C do not limit the scope of this disclosure to any particular implementation of a MIMO system.

As shown in FIG. 8A, the verification is to demonstrate that the MIMO system 400 with the in-panel isolator 402 has antenna isolation improvement over an existing dual-polarized antenna array 702. Spacing between the antenna elements 606 is 0.75λ and panel-to-panel spacing is 2.5λ. The mutual coupling, between a TX antenna and an RX antenna, has a unique frequency response, dependent on the location of the two antennas as well as within the antenna panel. The parameters for the walls of the in-panel isolator 402 are optimized to increase antenna isolation at 3.5 GHz.

As shown in FIGS. 8B and 8C, a port-to-port coupling analysis 800 was performed on the existing array 702 and a port-to-port coupling analysis 802 was performed on the MIMO system 400 with an in-panel isolator 402. Element 1-2 was used as an observation port with eight port-to-port coupling. Based on simulation results shown in Table 1, the average isolation enhancement is 11 dB. Moreover, the worst isolation level increases from 42.4 dB to 52.0 dB with 9.6 dB improvement.

TABLE 1

| | Comparison of antenna isolation with existing technique/designed isolator | |
| --- | --- | --- |
| Polarization | Isolation with existing technique (dB) | Isolation with designed isolator (dB) |
| 9H to 2H | 49.1 | 54.5 |
| 9V to 2H | 43.5 | 56.8 |
| 10H to 2H | 43.6 | 52.1 |
| 10V to 2H | 42.4 | 52.0 |
| 11H to 2H | 42.9 | 63.8 |
| 11V to 2H | 43.1 | 64.9 |
| 12H to 2H | 42.5 | 62.1 |
| 12V to 2H | 46.5 | 60.0 |

Although FIGS. 8A through 8C illustrate an example enhancement verification, various changes may be made to FIGS. 8A through 8C. For example, the enhancement verification may be used in any other suitable MIMO system process and is not limited to the specific processes described above.

Figure 9:
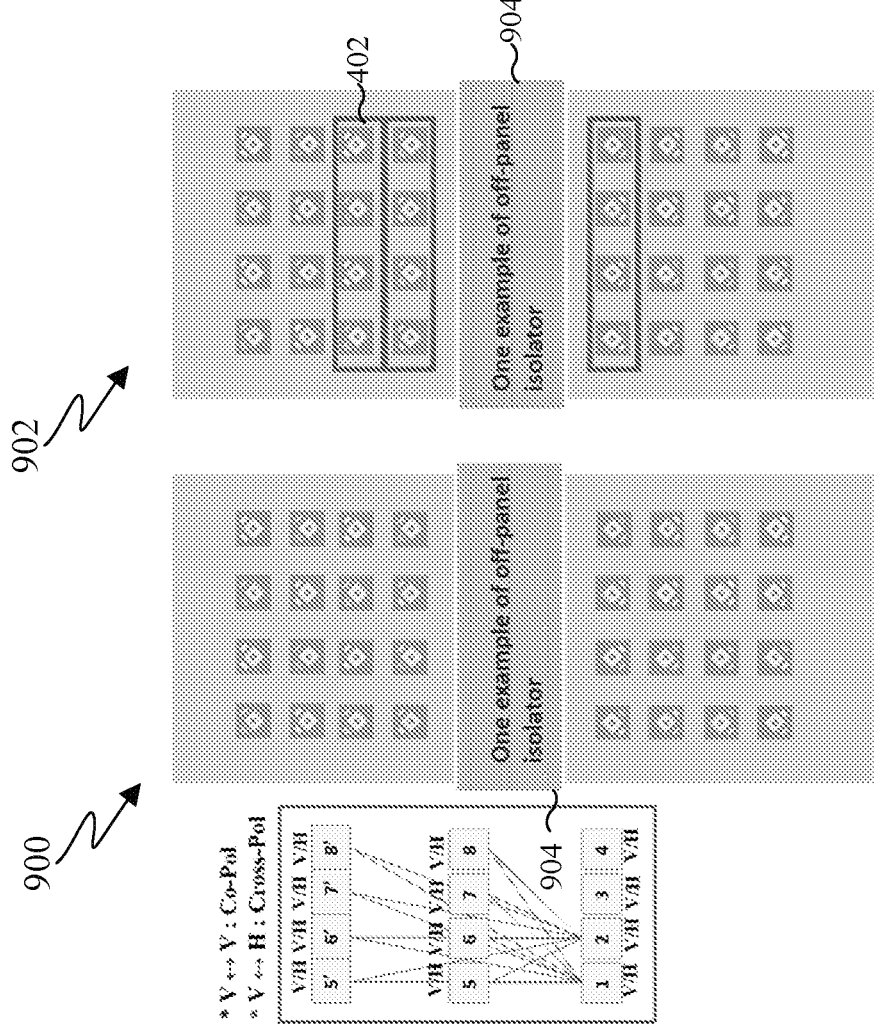
FIG. 9 illustrate an example enhancement verification between an antenna array without the in-panel antenna isolation enhancement and an antenna array with the in-panel antenna isolation enhancement in accordance with this disclosure.

FIG. 9 illustrate an example enhancement verification between an antenna array 900 with an off-panel isolator 904 and without an in-panel isolator 906 and an antenna array 902 with the in-panel isolator 402 and off-panel isolator 904 in accordance with this disclosure. The embodiment of the enhancement verification illustrated in FIG. 9 is for illustration only. FIG. 9 does not limit the scope of this disclosure to any particular implementation of a MIMO system.

As shown in FIG. 9, the first verification targets at the improvement from only the in-panel isolator 402. Typically, between TX and RX panels, an off-panel isolator 904 is utilized to improve isolation. Therefore, a second verification focuses on an improvement from an antenna system with only an off-panel isolator 904 and an antenna system with both an off-panel isolator 904 and an in-panel isolator 402. An example of second verification can be seen from the comparison in Table 2.

TABLE 2

| Comparison of antenna isolation with existing system with only an off-panel isolator and a MIMO system with both off-panel and in-panel isolators | | |
| --- | --- | --- |
| Polarization | Isolation with existing technique (dB) | Isolation with designed isolator (dB) |
| 9H to 2H | 50.3 | 60.0 |
| 9V to 2H | 52.2 | 64.9 |
| 10H to 2H | 52.1 | 62.2 |
| 10V to 2H | 57.5 | 65.0 |
| 11H to 2H | 57.9 | 64.8 |
| 11V to 2H | 52.1 | 60.3 |
| 12H to 2H | 50.8 | 61.0 |
| 12V to 2H | 54.2 | 61.4 |

The antenna elements 1 and 2 are used for an observation port, and dual polarization of eight different ports are compared. The two cases are simulated include antenna array with common ground and an antenna array with existing technique. Table 2 presents the co-polarization and cross-polarization results of ports to 2H. A minimum isolation increase from 50.3 dB to 60.0 dB with the designed in-panel isolator. Therefore, no matter for separate or complementary applications, the in-panel isolator significantly improves the antenna isolation.

Although FIG. 9 illustrates an example enhancement verification, various changes may be made to FIG. 9. For example, the sizes, shapes, and dimensions of the antenna arrays 900 and 902 and their individual components can vary as needed or desired. Also, the number and placement of various components of the antenna arrays 900 and 902 can vary as needed or desired. In addition, the antenna arrays 900 and 902 may be used in any other suitable MIMO process and is not limited to the specific processes described above.

Figure 10:
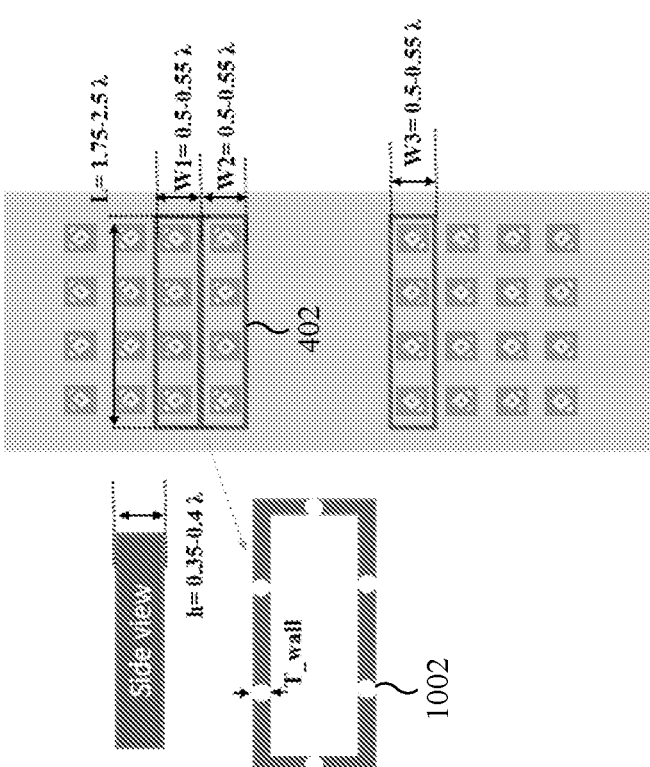
FIG. 10 illustrates an example fabrication of an in-panel antenna isolator in accordance with this disclosure.

FIG. 10 illustrates an example fabrication 1000 of an in-panel antenna isolator 402 in accordance with this disclosure. The embodiment of the fabrication of an in-panel antenna isolator 402 illustrated in FIG. 10 is for illustration only. FIG. 10 does not limit the scope of this disclosure to any particular implementation of a MIMO system.

As shown in FIG. 10, parameters of designed fence-wall structure can be optimized for different frequency bands. As the key parameters are determined at a given wavelength, the optimized range is presented. For example, the optimized length can be a value in a range from 1.75λ to 2.5λ, the optimized width can be a value in a range from 0.5λ to 0.55λ, and the optimized height can be value in a range from 0.35λ to 0.4λ. The in-panel isolator 402 can be surface mounted with six holes 1002 of printed circuit board, which utilize standard PCB assembly techniques. However, any amount of holes 1002 can be used to mount the in-panel isolator 402.

Although FIG. 10 illustrates an example fabrication 1000 of an in-panel antenna isolator 402, various changes may be made to FIG. 10. For example, the sizes, shapes, and dimensions of the in-panel antenna isolator 402 and its individual components can vary as needed or desired. In addition, the in-panel antenna isolator 402 may be fabricated in any other way and is not limited to the specific processes described above.

Figure 11A:
FIGS. 11A through 11C illustrate an example in-panel antenna isolation enhancement for a dual-polarized MIMO antenna array and simulation results in accordance with this disclosure.
Figure 11A:
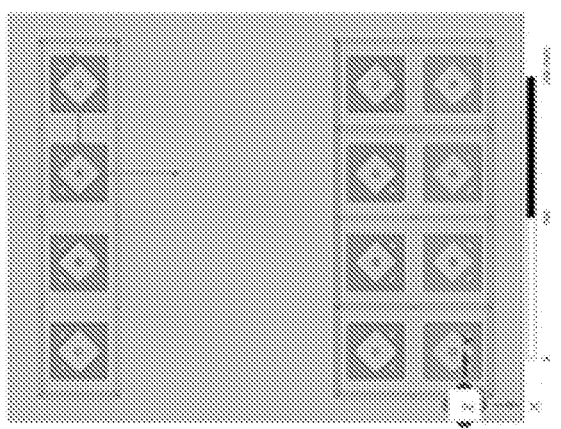
Figure 11B:
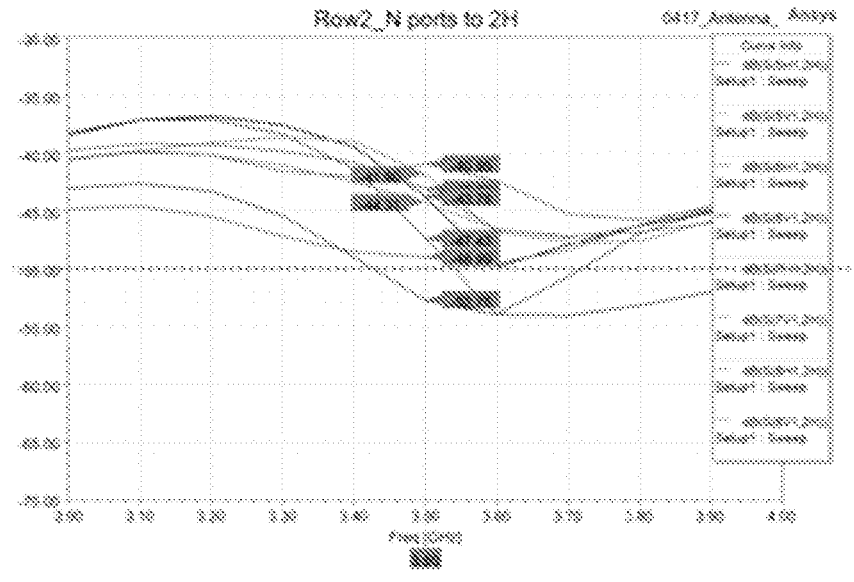
Figure 11C:
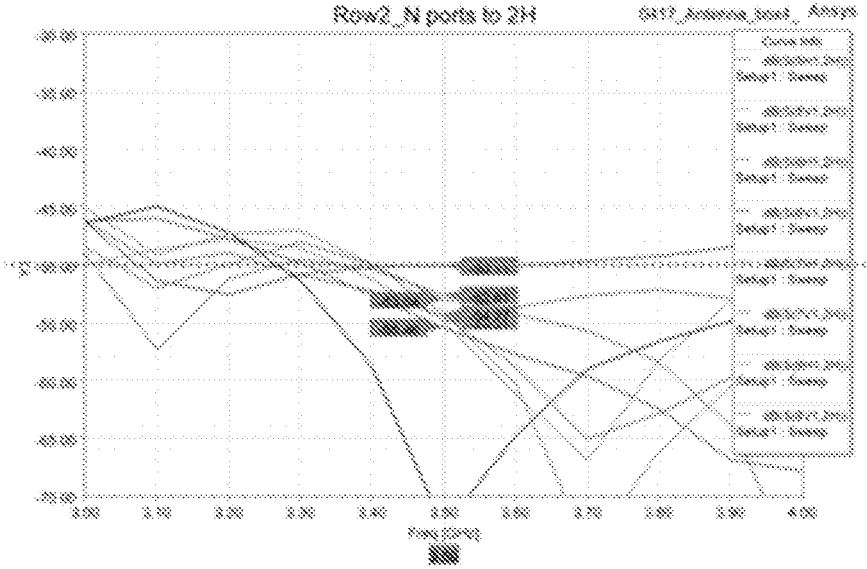

FIGS. 11A through 11C illustrate an example in-panel isolator 1100 for a dual-polarized MIMO antenna array and simulation results in accordance with this disclosure. The embodiments of the in-panel isolator 1100 illustrated in FIGS. 11A through 11C are for illustration only. FIGS. 11A through 11C do not limit the scope of this disclosure to any particular implementation of a MIMO system.

As shown in FIGS. 11A through 11C, in-panel-isolator 402 can be also applied to higher frequencies such as mmWave bands. Therefore, The in-panel isolator 402 can be a candidate of 5G or 6G base station antenna isolators with several possible modifications. A first modification of the length and width of the designed isolator can be 1.75-2λ and 0.5-0.55λ, which can be tuned for another frequency bands. Based on different antenna size, the length and width can be optimized. A second modification of the height of the designed isolator can be 0.35-0.4λ, which can be optimized for mmWave frequencies. The third modification of the inner wall boundary can be changed. The design procedures are similar to previously described design procedures. First, initial parameters are based on theoretical calculations. Next, the parameter analysis can be utilized to tune the resonance frequency by optimizing the parameters. Finally, numerical approaches can be used to optimize parameters.

Although FIGS. 11A through 11C illustrate an example in-panel isolator 1100, various changes may be made to FIGS. 11A through 11C. For example, the sizes, shapes, and dimensions of the example in-panel isolator 1100 and its individual components can vary as needed or desired. In addition, the example in-panel isolator 1100 may be used in any other suitable MIMO system and is not limited to the specific systems described above.

Figure 12:
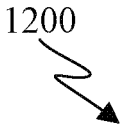
FIG. 12 illustrates an example method for in-panel antenna isolation enhancement for a dual-polarized MIMO antenna array according to this disclosure.
Figure 12:
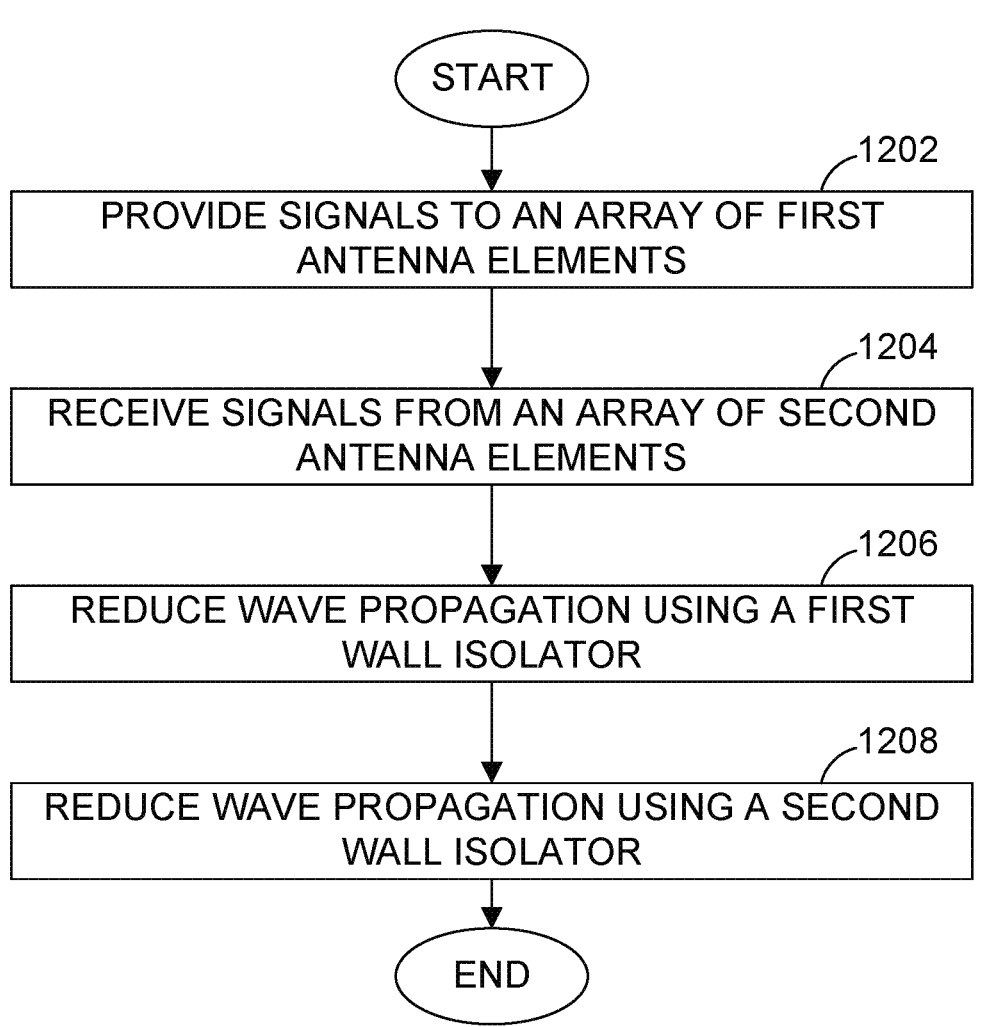

FIG. 12 illustrates an example method for in-panel antenna isolation enhancement for a dual-polarized MIMO antenna array according to this disclosure. For ease of explanation, the method 1200 of FIG. 12 is described as being performed using the MIMO system 400 of FIG. 4. However, the method 1200 may be used with any other suitable system and any other suitable MIMO system.

As shown in FIG. 12, The MIMO system 400 provides signals to an array of first antenna elements at step 1202. The MIMO system 400 provides signals to a first antenna panel including an array of first antenna elements on a substrate.

The MIMO system 400 receive signals from an array of second antenna elements at step 1204. The MIMO system 400 can receive signals from a second antenna panel including an array of second antenna elements on the substrate.

The MIMO system 400 reduces wave propagation using a first wall isolator at step 1206. The MIMO system 400 can reduce wave propagation between the array of first antenna elements and the array of second antenna elements using a first wall isolator. The first wall isolator protrudes from second antenna panel. The first wall isolator forms a border to surround at least one of the second antenna elements on the second antenna panel. The first wall isolator isolates the at least one second antenna element from the first antenna elements to produce N-to-N antenna isolation. The first wall isolator surrounds at least two of the second antenna elements. The first wall isolator can include an interior wall isolator that subdivides and isolates at least two of the second antenna elements. The interior wall isolator subdivides at least two second antenna elements from at least two other second antenna elements within the first wall isolator.

One or more of a length, a width, a height, or a shape of the first wall isolator is based on a mmWave frequency band used by the at least one second antenna element. In certain embodiments, the length can be a value in a range from 1.75λ to 2.5λ, the width can be a value in a range from 0.5λ to 0.55λ, and the height can be a value in a range from 0.35λ to 0.4λ.

The MIMO system 400 reduces wave propagation using a second wall isolator at step 1208. The MIMO system 400 can reduce wave propagation between the array of first antenna elements and the array of second antenna elements using a first wall isolator using a second wall isolator extending from the first antenna panel. The second wall isolator forms a border to surround at least one of the first antenna elements on the first antenna panel. The second wall isolator is configured to isolate the at least one of the first antenna elements from the second antenna elements. One or more of a length, a width, a height, or a shape of the second wall isolator is based on a mmWave frequency band used by the at least one first antenna element.

Although FIG. 12 illustrates one example of a method 1200 for in-panel antenna isolation enhancement for a dual-polarized MIMO antenna array, various changes may be made to FIG. 12. For example, while shown as a series of steps, various steps in FIG. 12 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
a substrate;
a first antenna panel on the substrate and comprising an array of transmit antenna elements; and
a second antenna panel on the substrate comprising:
   an array of receive antenna elements, and
   a first wall isolator (i) protruding from the second antenna panel, (ii) forming a border to surround at least one of the receive antenna elements on the second antenna panel, and (iii) configured to electromagnetically isolate the at least one receive antenna element from the transmit antenna elements to produce N-to-N antenna isolation.

2. The apparatus of claim 1, wherein one or more of a length, a width, a height, or a shape of the first wall isolator is based on a mmWave frequency band used by the at least one receive antenna element.

3. The apparatus of claim 2, wherein:
the length is a value in a range from 1.75λ to 2.5λ,
the width is a value in a range from 0.5λ to 0.55λ, and
the height is a value in a range from 0.35λ to 0.4λ.

4. The apparatus of claim 1, wherein:
the first wall isolator surrounds at least two of the receive antenna elements, and
the first wall isolator includes an interior wall isolator that subdivides and isolates the at least two of the receive antenna elements.

5. The apparatus of claim 4, wherein the interior wall isolator subdivides at least two receive antenna elements from at least two other receive antenna elements within the first wall isolator.

6. The apparatus of claim 1, wherein the second antenna panel further comprises:
a second wall isolator extending from the first antenna panel and forming a border to surround at least one of the transmit antenna elements on the first antenna panel and configured to isolate the at least one of the transmit antenna elements from the receive antenna elements.

7. The apparatus of claim 6, wherein one or more of a length, a width, a height, or a shape of the second wall isolator is based on a mmWave frequency band used by the at least one transmit antenna element.

8. An electronic device comprising:
a multiple input multiple output (MIMO) antenna comprising:
   a substrate;
   a first antenna panel on the substrate and comprising an array of first transmit antenna elements; and
   a second antenna panel on the substrate comprising:
      an array of receive antenna elements, and
      a first wall isolator (i) protruding from the second antenna panel, (ii) forming a border to surround at least one of the receive antenna elements on the second antenna panel, and (iii) configured to electromagnetically isolate the at least one receive antenna element from the transmit antenna elements to produce N-to-N antenna isolation;
transmit (TX) processing circuitry coupled to the first antenna panel and configured to provide signals to the array of transmit antenna elements; and
receive (RX) processing circuitry coupled to the second antenna panel and configured to receive signals from the array of receive antenna elements.

9. The electronic device of claim 8, wherein one or more of a length, a width, a height, or a shape of the first wall isolator is based on a mmWave frequency band used by the at least one receive antenna element.

10. The electronic device of claim 9, wherein:
the length is a value in a range from 1.75λ to 2.5λ,
the width is a value in a range from 0.5λ to 0.55λ, and
the height is a value in a range from 0.35λ to 0.4λ.

11. The electronic device of claim 8, wherein:
the first wall isolator surrounds at least two of the receive antenna elements, and
the first wall isolator includes an interior wall isolator that subdivides and isolates the at least two of the receive antenna elements.

12. The electronic device of claim 11, wherein the interior wall isolator subdivides at least two receive antenna elements from at least two other receive antenna elements within the first wall isolator.

13. The electronic device of claim 8, wherein the second antenna panel further comprises:
a second wall isolator extending from the first antenna panel and forming a border to surround at least one of the transmit antenna elements on the first antenna panel and configured to isolate the at least one of the transmit antenna elements from the receive antenna elements.

14. The electronic device of claim 13, wherein one or more of a length, a width, a height, or a shape of the second wall isolator is based on a mmWave frequency band used by the at least one transmit antenna element.

15. A method of using a massive MIMO antenna comprising:

providing signals to a first antenna panel including an array of transmit antenna elements on a substrate;

receiving signals from a second antenna panel including an array of receive antenna elements on the substrate; and reducing wave propagation between the array of first transmit antenna elements and the array of receive antenna elements using a first wall isolator (i) protruding from the second antenna panel, (ii) forming a border to surround at least one of the receive antenna elements on the second antenna panel, and (iii) isolating the at least one receive antenna element from the first-transmit antenna elements to produce N-to-N antenna isolation.

16. The method of claim 15, wherein one or more of a length, a width, a height, or a shape of the first wall isolator is based on a mmWave frequency band used by the at least one receive antenna element.

17. The method of claim 16, wherein:

the length is a value in a range from $1.75\lambda$ to $2.5\lambda$, the width is a value in a range from $0.5\lambda$ to $0.55\lambda$, and the height is a value in a range from $0.35\lambda$ to $0.4\lambda$.

18. The method of claim 15, wherein:

the first wall isolator surrounds at least two of the receive antenna elements, and the first wall isolator includes an interior wall isolator that subdivides and isolates the at least two of the receive antenna elements.

19. The method of claim 18, wherein the interior wall isolator subdivides at least two receive antenna elements from at least two other receive antenna elements within the first wall isolator.

20. The method of claim 15, further comprising:

reducing wave propagation between the array of first antenna elements and the array of receive antenna elements using a first wall isolator using a second wall isolator extending from the first antenna panel and forming a border to surround at least one of the transmit antenna elements on the first antenna panel and configured to isolate the at least one of the transmit antenna elements from the receive antenna elements, wherein one or more of a length, a width, a height, or a shape of the second wall isolator is based on a mmWave frequency band used by the at least one transmit antenna element.

\* \* \* \* \*